US008229454B1

(12) United States Patent
Yoakum

(10) Patent No.: US 8,229,454 B1
(45) Date of Patent: Jul. 24, 2012

(54) PERSONAL LOCATION INFORMATION MANAGEMENT

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 1737 days.

(21) Appl. No.: 10/805,887

(22) Filed: Mar. 22, 2004

(51) Int. Cl.
*H04W 24/00* (2009.01)
*H04M 3/42* (2006.01)
*H04M 3/493* (2006.01)

(52) U.S. Cl. ............... 455/456.1; 455/456.3; 455/414.2
(58) Field of Classification Search ............... 455/414.1, 455/414.2, 440, 456.1, 456.3
See application file for complete search history.

(56) References Cited

U.S. PATENT DOCUMENTS

| | | | |
|---|---|---|---|
| 4,932,050 A | 6/1990 | Davidson et al. | 379/211 |
| 5,185,782 A | 2/1993 | Srinivasan | 379/67 |
| 5,243,645 A | 9/1993 | Bissell et al. | 379/211 |
| 5,315,636 A | 5/1994 | Patel | 379/58 |
| 5,414,759 A | 5/1995 | Ishikuri et al. | 379/88 |
| 5,450,613 A | 9/1995 | Takahara et al. | 455/54.1 |
| 5,550,907 A | 8/1996 | Carlsen | 379/207 |
| 5,555,376 A | 9/1996 | Theimer et al. | 395/200.09 |
| 5,596,633 A | 1/1997 | Meier et al. | 379/201 |
| 5,633,921 A | 5/1997 | Soderberg | 379/207 |
| 5,633,924 A | 5/1997 | Kaish et al. | 379/266 |
| 5,742,905 A | 4/1998 | Pepe et al. | 455/461 |
| 5,757,901 A | 5/1998 | Hiroshige | 379/212 |
| 5,771,280 A | 6/1998 | Johnson | 379/93.23 |
| 5,790,649 A | 8/1998 | Hiroshige | 379/201 |
| 5,812,865 A | 9/1998 | Theimer et al. | 395/800 |
| 5,815,554 A | 9/1998 | Burgess et al. | 379/90.01 |
| 5,825,864 A | 10/1998 | McGraw et al. | 379/210 |
| 5,901,359 A | 5/1999 | Malmstrom | |
| 5,930,702 A | 7/1999 | Goldman et al. | 455/417 |
| 5,960,173 A | 9/1999 | Tang et al. | |
| 6,052,597 A | 4/2000 | Ekstrom | |
| 6,058,415 A | 5/2000 | Polcyn | 709/200 |

(Continued)

FOREIGN PATENT DOCUMENTS

EP 1148688 A1 4/2000

(Continued)

OTHER PUBLICATIONS

Brodsky, Alexander et al., "Resource Management in Agent-based Distributed Environments," Proceedings of the 1999 International Symposium on Kyoto, Japan Nov. 28-30, 1999, pp. 95-108, XP010379697.

(Continued)

*Primary Examiner* — Andrew Wendell
(74) *Attorney, Agent, or Firm* — Withrow & Terranova, PLLC

(57) ABSTRACT

The present invention provides for delivering location information to any number of subscribers via their respective location applications, which may run on any type of communication device. The location is derived from state information received from one or more devices with which the user interacts or a system associated therewith. The state information is processed to create the location information, which is provided to the location applications of the subscribers. The system may allow the user to establish a profile, which defines to whom and how location information is disseminated. The profile may specify those who can receive location information, those who cannot receive location information, and those who should always get the location information even if others are restricted by time, date, location, or other criteria specified by the user. Further, certain subscribers may receive a preset location, regardless of the received state information.

52 Claims, 5 Drawing Sheets

U.S. PATENT DOCUMENTS

| | | | |
|---|---|---|---|
| 6,067,357 A | 5/2000 | Kishinsky et al. | 379/265 |
| 6,104,913 A | 8/2000 | McAllister | 455/41 |
| 6,125,176 A | 9/2000 | Foladare et al. | 379/211 |
| 6,134,314 A | 10/2000 | Dougherty et al. | 379/207 |
| 6,141,356 A | 10/2000 | Gorman | 370/493 |
| 6,144,644 A | 11/2000 | Bajzath et al. | 370/259 |
| 6,148,328 A | 11/2000 | Cuomo et al. | 709/204 |
| 6,175,616 B1 | 1/2001 | Light et al. | 379/88.14 |
| 6,185,292 B1 | 2/2001 | Miloslavsky | 379/265 |
| 6,223,165 B1 | 4/2001 | Lauffer | 705/8 |
| 6,233,465 B1 | 5/2001 | Smith et al. | |
| 6,243,398 B1 | 6/2001 | Kahane et al. | 370/522 |
| 6,253,230 B1 | 6/2001 | Couland et al. | |
| 6,260,148 B1 | 7/2001 | Aggarwal et al. | 713/201 |
| 6,295,348 B1 | 9/2001 | Bleile et al. | 379/199 |
| 6,301,609 B1 | 10/2001 | Aravamudan et al. | 709/207 |
| 6,330,322 B1 | 12/2001 | Foladare et al. | |
| 6,377,944 B1 | 4/2002 | Busey et al. | 707/3 |
| 6,389,127 B1 | 5/2002 | Vardi et al. | 379/209.01 |
| 6,418,198 B2 | 7/2002 | Brablec et al. | 379/79 |
| 6,430,289 B1 | 8/2002 | Liffick | 379/900 |
| 6,430,395 B2 | 8/2002 | Arazi et al. | |
| 6,445,912 B1 | 9/2002 | Cole et al. | 455/406 |
| 6,449,344 B1 | 9/2002 | Goldfinger et al. | 379/88.17 |
| 6,463,142 B1 | 10/2002 | Kilp | 379/201.06 |
| 6,463,471 B1 | 10/2002 | Dreke et al. | 709/224 |
| 6,480,593 B1 | 11/2002 | Munday et al. | 379/211.02 |
| 6,483,900 B1 | 11/2002 | Light et al. | 379/88.17 |
| 6,519,639 B1 | 2/2003 | Glasser et al. | 709/224 |
| 6,546,096 B1 | 4/2003 | Meiden et al. | 379/209.01 |
| 6,549,937 B1 | 4/2003 | Auerbach et al. | |
| 6,560,648 B1 | 5/2003 | Dunn et al. | 709/224 |
| 6,564,261 B1 | 5/2003 | Gudjonsson et al. | 709/227 |
| 6,584,494 B1 | 6/2003 | Manabe et al. | |
| 6,617,969 B2 | 9/2003 | Tu et al. | |
| 6,618,710 B1 | 9/2003 | Zondervan et al. | |
| 6,633,636 B1 | 10/2003 | McConnell et al. | |
| 6,640,241 B1 | 10/2003 | Ozzie et al. | |
| 6,654,790 B2 | 11/2003 | Ogle et al. | |
| 6,658,095 B1 | 12/2003 | Yoakum et al. | 379/93.01 |
| 6,665,395 B1 | 12/2003 | Busey et al. | 379/265.09 |
| 6,678,719 B1 | 1/2004 | Stimmel | |
| 6,697,840 B1 | 2/2004 | Godefroid et al. | 709/205 |
| 6,700,966 B2 | 3/2004 | Takagi et al. | 379/201.06 |
| 6,728,754 B1 | 4/2004 | Lipton | |
| 6,735,701 B1 | 5/2004 | Jacobson | 713/201 |
| 6,738,461 B2 | 5/2004 | Trandal et al. | 379/142.02 |
| 6,741,853 B1 | 5/2004 | Jiang et al. | |
| 6,799,209 B1 | 9/2004 | Hayton | |
| 6,807,423 B1 | 10/2004 | Armstrong et al. | 455/440 |
| 6,810,411 B1 | 10/2004 | Coughlin et al. | 709/203 |
| 6,920,498 B1 | 7/2005 | Gourlay et al. | |
| 6,985,961 B1 | 1/2006 | Ramsayer et al. | |
| 7,010,306 B1* | 3/2006 | Tanibayashi et al. | 455/456.1 |
| 7,020,480 B2 | 3/2006 | Coskun et al. | |
| 7,035,923 B1* | 4/2006 | Yoakum et al. | 709/224 |
| 7,085,578 B2* | 8/2006 | Barclay et al. | 455/457 |
| 7,103,651 B2 | 9/2006 | Bohannon et al. | |
| 7,136,631 B1 | 11/2006 | Jiang et al. | |
| 7,212,617 B2 | 5/2007 | Owens et al. | |
| 7,227,937 B1* | 6/2007 | Yoakum et al. | 379/201.01 |
| 7,269,162 B1 | 9/2007 | Turner | |
| 7,356,137 B1 | 4/2008 | Burg et al. | |
| 7,610,011 B2* | 10/2009 | Albrett | 455/3.04 |
| 2001/0005412 A1 | 6/2001 | Light et al. | 379/88.13 |
| 2001/0039585 A1 | 11/2001 | Primak et al. | 709/228 |
| 2001/0044299 A1 | 11/2001 | Sandegren | 455/422 |
| 2001/0053213 A1 | 12/2001 | Truong et al. | 379/202.01 |
| 2001/0053214 A1 | 12/2001 | Kleinoder et al. | 379/207.04 |
| 2002/0006803 A1 | 1/2002 | Mendiola et al. | 455/466 |
| 2002/0024947 A1 | 2/2002 | Luzzatti et al. | 370/352 |
| 2002/0032035 A1* | 3/2002 | Teshima | 455/456 |
| 2002/0035605 A1 | 3/2002 | McDowell et al. | 709/206 |
| 2002/0038360 A1 | 3/2002 | Andrews et al. | 709/223 |
| 2002/0049842 A1 | 4/2002 | Huetsch et al. | |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0078188 A1 | 6/2002 | Anand et al. | 709/222 |
| 2002/0085516 A1 | 7/2002 | Bridgelall | |
| 2002/0101993 A1 | 8/2002 | Eskin | 380/270 |
| 2002/0102993 A1* | 8/2002 | Hendrey et al. | 455/456 |
| 2002/0111173 A1* | 8/2002 | Hendrey et al. | 455/456 |
| 2002/0114432 A1 | 8/2002 | Shaffer et al. | 379/90.01 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0131395 A1 | 9/2002 | Wang | |
| 2002/0143876 A1 | 10/2002 | Boyer et al. | 709/205 |
| 2002/0143877 A1 | 10/2002 | Hackbarth et al. | 709/205 |
| 2002/0147008 A1 | 10/2002 | Kallio | 455/426 |
| 2002/0147777 A1 | 10/2002 | Hackbarth et al. | 709/205 |
| 2002/0147814 A1 | 10/2002 | Kimchi et al. | 709/226 |
| 2002/0163572 A1 | 11/2002 | Center, Jr. et al. | 348/14.08 |
| 2002/0165000 A1 | 11/2002 | Fok | |
| 2002/0181693 A1 | 12/2002 | Ribera | 379/265.09 |
| 2002/0194335 A1 | 12/2002 | Maynard | 709/225 |
| 2002/0196770 A1 | 12/2002 | Lin | 370/349 |
| 2003/0002642 A1 | 1/2003 | Jorasch et al. | |
| 2003/0004762 A1 | 1/2003 | Banerjee et al. | 705/5 |
| 2003/0018704 A1 | 1/2003 | Polychronidis et al. | 709/202 |
| 2003/0023623 A1 | 1/2003 | Horvitz et al. | |
| 2003/0023681 A1 | 1/2003 | Brown et al. | |
| 2003/0026289 A1 | 2/2003 | Mukherjee et al. | 370/466 |
| 2003/0028621 A1 | 2/2003 | Furlong et al. | |
| 2003/0035529 A1 | 2/2003 | Baker | 379/211.02 |
| 2003/0037103 A1 | 2/2003 | Salmi et al. | 709/203 |
| 2003/0037113 A1 | 2/2003 | Petrovykh | 709/205 |
| 2003/0041101 A1 | 2/2003 | Hansche et al. | 709/203 |
| 2003/0048195 A1 | 3/2003 | Trossen | 340/825.49 |
| 2003/0052915 A1 | 3/2003 | Brown et al. | |
| 2003/0055897 A1 | 3/2003 | Brown et al. | |
| 2003/0059029 A1 | 3/2003 | Mengshoel et al. | 379/265.02 |
| 2003/0065721 A1 | 4/2003 | Roskind | 709/204 |
| 2003/0065788 A1 | 4/2003 | Salomaki | 709/227 |
| 2003/0069934 A1 | 4/2003 | Garcia-Martin et al. | |
| 2003/0073440 A1 | 4/2003 | Mukherjee et al. | 455/435 |
| 2003/0078979 A1 | 4/2003 | Sagi | |
| 2003/0093482 A1 | 5/2003 | Watanabe et al. | |
| 2003/0101278 A1 | 5/2003 | Garcia-Luna-Aceves et al. | 709/240 |
| 2003/0104819 A1 | 6/2003 | Knauerhase et al. | |
| 2003/0105820 A1 | 6/2003 | Haims et al. | 709/205 |
| 2003/0129972 A1 | 7/2003 | Tosaki et al. | 455/414 |
| 2003/0134638 A1 | 7/2003 | Sundar et al. | |
| 2003/0135624 A1 | 7/2003 | McKinnon et al. | 709/228 |
| 2003/0154293 A1 | 8/2003 | Zmolek | 709/228 |
| 2003/0174814 A1 | 9/2003 | Diacakis | 379/80 |
| 2003/0206619 A1 | 11/2003 | Curbow et al. | 379/210.01 |
| 2003/0217099 A1 | 11/2003 | Bobde et al. | |
| 2003/0217142 A1 | 11/2003 | Bobde et al. | |
| 2003/0225848 A1 | 12/2003 | Heikes et al. | |
| 2003/0229722 A1 | 12/2003 | Beyda | |
| 2003/0233537 A1 | 12/2003 | Wohlgemuth et al. | |
| 2003/0235287 A1 | 12/2003 | Margolis | 379/265.01 |
| 2004/0037271 A1 | 2/2004 | Liscano et al. | 370/352 |
| 2004/0044647 A1 | 3/2004 | Salmenkaita | 707/1 |
| 2004/0059781 A1 | 3/2004 | Yoakum et al. | |
| 2004/0072593 A1 | 4/2004 | Robbins et al. | |
| 2004/0073614 A1 | 4/2004 | Blohm | |
| 2004/0122810 A1 | 6/2004 | Mayer | 707/3 |
| 2004/0122901 A1 | 6/2004 | Sylvain | |
| 2004/0125941 A1 | 7/2004 | Yoakum | |
| 2004/0153506 A1 | 8/2004 | Ito et al. | 709/204 |
| 2004/0172528 A1 | 9/2004 | Tenereillo | |
| 2004/0174966 A1 | 9/2004 | Koch | 379/88.22 |
| 2004/0177278 A1 | 9/2004 | Lipton | |
| 2004/0192299 A1* | 9/2004 | Wilson et al. | 455/433 |
| 2004/0198385 A1* | 10/2004 | Wheeler et al. | 455/456.1 |
| 2004/0203746 A1 | 10/2004 | Knauerhase et al. | |
| 2004/0203848 A1 | 10/2004 | Kumar | |
| 2004/0203869 A1* | 10/2004 | Annamalai | 455/456.1 |
| 2004/0203927 A1* | 10/2004 | Kraft | 455/456.2 |
| 2004/0249776 A1 | 12/2004 | Horviz et al. | 706/21 |

| | | | |
|---|---|---|---|
| 2004/0266398 | A1 | 12/2004 | Adamczyk et al. |
| 2005/0041580 | A1 | 2/2005 | Petrovykh |
| 2005/0044144 | A1 | 2/2005 | Malik et al. |
| 2005/0063528 | A1* | 3/2005 | Pearson et al. ........... 379/211.01 |
| 2005/0070282 | A1 | 3/2005 | Hinz |
| 2005/0074101 | A1 | 4/2005 | Moore et al. ............. 379/114.01 |
| 2005/0086211 | A1 | 4/2005 | Mayer |
| 2005/0117570 | A1 | 6/2005 | Cetusic et al. ................. 370/352 |
| 2005/0135429 | A1 | 6/2005 | Bingham et al. |
| 2005/0136845 | A1* | 6/2005 | Masuoka et al. ........... 455/67.14 |
| 2005/0159153 | A1 | 7/2005 | Mousseau et al. |
| 2005/0172011 | A1 | 8/2005 | Gourlay et al. |
| 2006/0025158 | A1* | 2/2006 | Leblanc et al. ............ 455/456.2 |
| 2006/0078101 | A1 | 4/2006 | Light et al. |
| 2006/0167977 | A1 | 7/2006 | Wu et al. |
| 2007/0189489 | A1 | 8/2007 | Carnazza et al. |
| 2007/0275730 | A1* | 11/2007 | Bienas et al. .............. 455/456.1 |
| 2007/0293237 | A1* | 12/2007 | Correal et al. ............. 455/456.1 |
| 2008/0004043 | A1* | 1/2008 | Wilson et al. .............. 455/456.3 |
| 2008/0045234 | A1* | 2/2008 | Reed .......................... 455/456.1 |
| 2008/0091786 | A1* | 4/2008 | Jhanji ........................... 709/206 |
| 2009/0131076 | A1* | 5/2009 | Moeglein et al. .......... 455/456.1 |

FOREIGN PATENT DOCUMENTS

| | | |
|---|---|---|
| EP | 1071295 A2 | 1/2001 |
| EP | 1 225 752 A2 | 7/2002 |
| EP | 1 329 810 A1 | 7/2003 |
| WO | 99/17194 | 4/1999 |
| WO | WO 99/34628 | 7/1999 |

OTHER PUBLICATIONS

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

Day, M. and Rosenberg, J., "Request for Comments (RFC) 2778: A Model for Presence and Instant Messaging," IETF—Network Working Group, Information Memo, Feb. 2000, XP002201444.

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

Crocker, D., et al., "A Common Profile for Instant Messaging (CPIM)—draft-ietf-impp-cpim-01," Network Working Group, Internet Draft, Aug. 2000, expires Feb. 19, 2001, http://www.jdrosen.net/papers/draft-mrose-impp-common00.txt, accessed Apr. 26, 2011, 26 pages.

Day, M., et al., "Instant Messaging/Presence Protocol Requirements," Network Working Group, Request for Comment (RFC) 2779, Feb. 2000, http://www.ietf.org/rfc/rfc2779.txt, 23 pages.

International Search Report for related application PCT/IB02/05523, mailed Apr. 15, 2003.

International Search Report for related application PCT/IB03/03994, mailed Mar. 30, 2004.

International Search Report for related application PCT/IB2006/002542, mailed Feb. 28, 2007.

Rosenberg, J., et al., "SIP Caller Preferences and Callee Capabilities," Internet Engineering Task Force, Internet Draft, Nov. 24, 2000, http://tools.ietf.org/id/draft-ietf-sip-callerprefs-03.txt, 25 pages.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for related application PCT/US02/40882, mailed Oct. 8, 2003.

PCT International Search Report for PCT/IB03/04250, mailed Jan. 19, 2004.

PCT International Search Report for PCT/IB03/03962, mailed Jan. 28, 2004.

International Search Report for related application PCT/US02/40882, mailed May 4, 2004.

Day, M. et al., "A Model for Presence and Instant Messaging," IETF REquest for Comments, XX, XX, No. 2778, Feb. 2000, pp. 1-17.

Eschenburg, Axel, "Wo Laufen Sie Denn? ICQ Haelt Verbindung Zu Bekannten," CT Magazin Fuer Computer Technik, Verlag Heinz Heise GmbH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

* cited by examiner

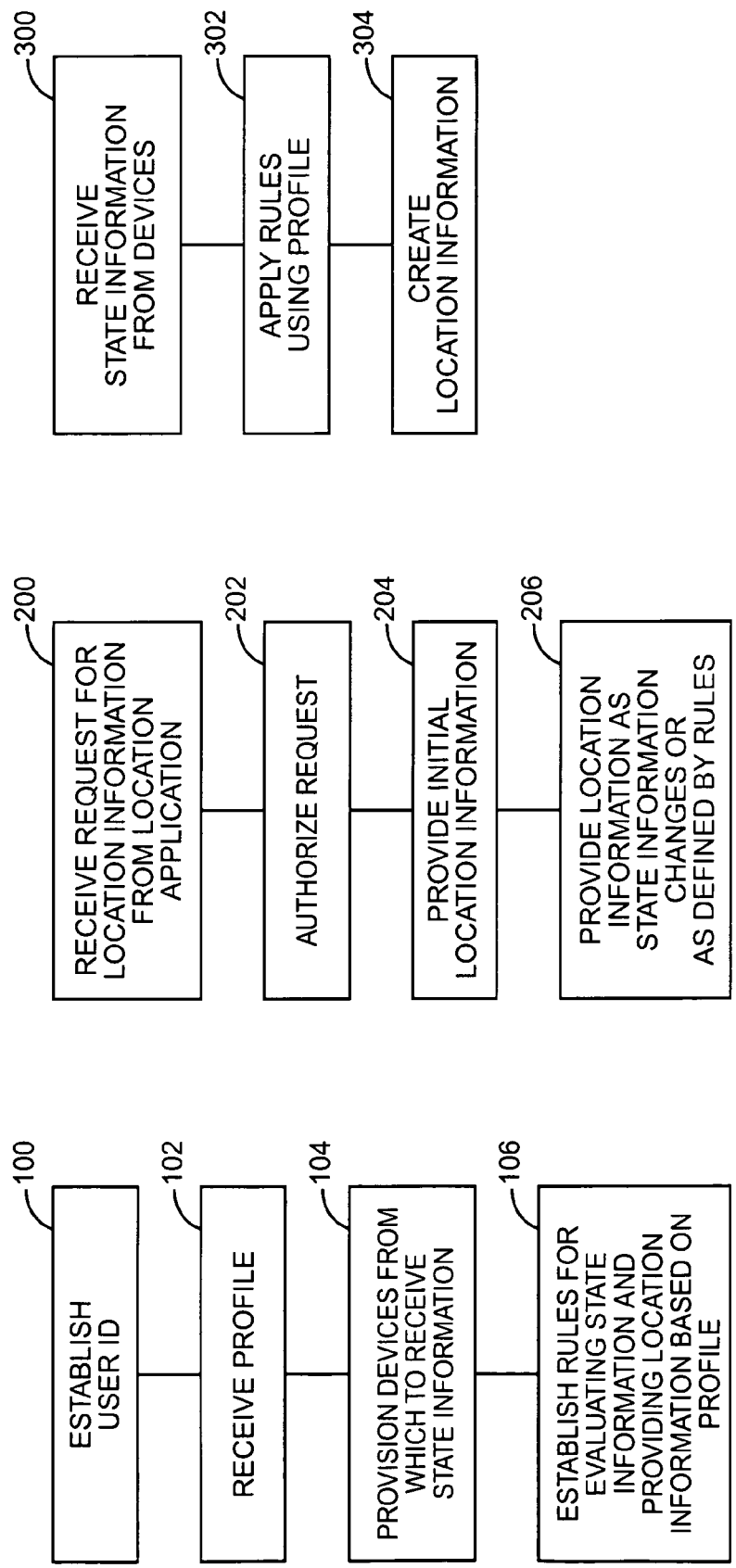

PERSONAL LOCATION INFORMATION MANAGEMENT

FIELD OF THE INVENTION

The present invention relates to providing location information, and in particular to controlling how the location information is disseminated in a managed fashion.

BACKGROUND OF THE INVENTION

Individuals and businesses are often interested in the location of those which whom they wish to communicate. The location of an individual may dictate if communications are initiated, how the communications are initiated, and what information is actually communicated to that individual. For example, business owners may want to send advertisements or related information to individuals who are within a certain proximity of the business or location of interest. The information may be sent to the user on their mobile device, such as a mobile telephone, mobile personal digital assistant (PDA), mobile computer, or the like.

The targeted individuals are also interested in controlling the information being sent to their various communication devices. These individuals may also desire to control who has access to their location information, as well as when and how such location information is provided. Unfortunately, there is no consolidated system for receiving signals from various devices with which the individual interacts and providing an accurate depiction of the individual's location, and further providing this depiction to those desiring to know the individual's location in a controlled fashion. Accordingly, there is a need for a system in which various devices with which a user interacts are monitored to determine an accurate location for the individual and to allow the user to control the dissemination of the location information as desired.

SUMMARY OF THE INVENTION

The present invention provides for delivering location information to any number of subscribers via their respective location applications, which may run on any type of communication device. The location is derived from state information received from one or more devices with which a user interacts or a system associated therewith. The state information is processed to create the location information, which is provided to the location applications of the subscribers. The system may allow the user to establish a profile, which defines to whom and how location information is disseminated. The profile may specify those subscribers who can receive location information, those who cannot receive location information, and those who should always get the location information even if others are restricted by time, date, location, or other criteria specified by the user. Further, certain subscribers may receive a preset location, regardless of the received state information. Accordingly, the state information associated with the user may be used to create location information, where different views of the user's location may be provided to different subscribers according to a defined profile.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 is a flow diagram outlining a provisioning process according to one embodiment of the present invention.

FIG. 4 is a flow diagram outlining overall operation of a location system according to one embodiment of the present invention.

FIG. 5 is an exemplary flow diagram outlining the processing of state information.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a location system capable of monitoring state information derived from one or more sources over any number of disparate networks. Preferably, the sources of state information are devices, which are used by a user throughout a normal day and configured to provide state information to the location system. The sources monitor normal user interactions and automatically provide corresponding state information to the location system, preferably without requiring the user to enter or otherwise provide information bearing on their status or availability. The location system will evaluate the state information from one or more sources to create location information to deliver to subscribers. The state information bears on the location of the user and may take many forms. The location information may range from complex analysis of state information from many devices to simply the states of selected devices. Further, a profile may be established to define rules for disseminating the location information. Different subscribers may have different levels of access to the location information. The following outlines numerous sources of state information along with the provisioning and operation of a location system.

Figure 1:
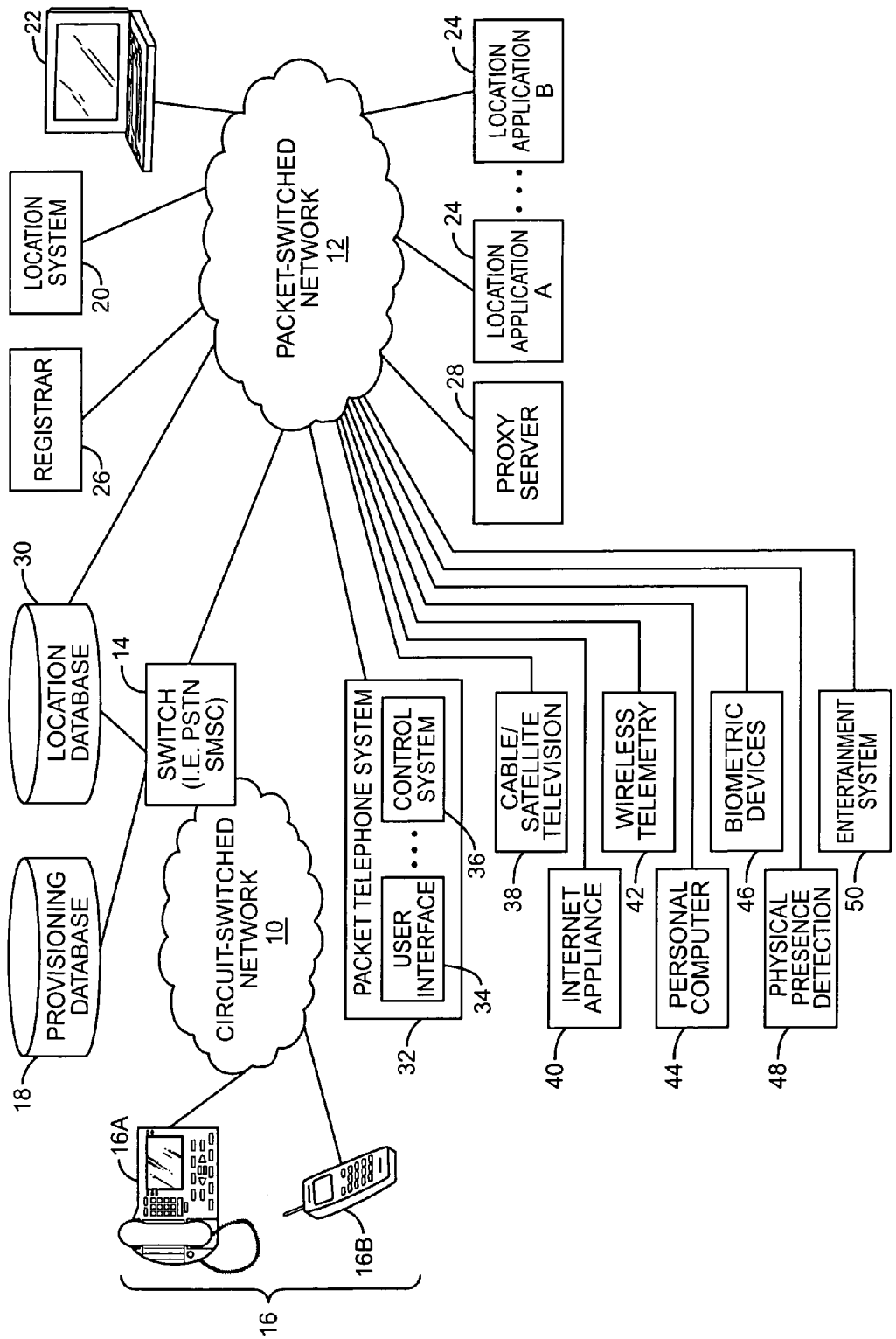
FIG. 1 is a block representation of a communication environment according to one embodiment of the present invention.

With reference to FIG. 1, a communication environment that is capable of automatically generating location information from one or more sources is illustrated. The communication environment may include a circuit-switched network 10, such as the Public Switched Telephone Network (PSTN) or a cellular communication network, and a packet-switched network 12, such as the Internet, which supports packet-switched communications. The circuit-switched network 10 may include various types of switches 14 to facilitate circuit-switched communications for landline or wireless communications. The circuit-switched network 10 supports communications with various types of telephony devices 16, such as a traditional landline telephone 16A or a mobile telephone 16B. In a wireless communication embodiment, the switches 14 cooperate with base stations (not shown), which facilitate wireless communications with mobile terminals, such as the mobile telephone 16B. Those skilled in the art will recognize the functionality of the switches 14 and other components in the circuit-switched network 10 to facilitate communications with the landline and wireless telephony devices 16.

The switch 14 is defined as being either an integrated device or multi-component system facilitating circuit-switched communication and including call server or call control functionality, which is traditionally provided in intelligent networks (IN), such as those implementing Signaling Systems 7 (SS7) and the like. Typically, the switches 14 cooperate with a provisioning database 18, which provides information allowing a switch 14 to properly identify, locate, and provision the various telephony devices 16 in the circuit-switched network 10. As noted, the present invention is particularly beneficial for automatically delivering state information, which is derived from natural user interaction with any number of sources, to a location system 20 located on the packet-switched network 12. For example, the switch 14 may be configured to provide the state of the telephony device 16, which is indicative of the user's location, directly or indirectly to the location system 20.

The location system 20 may be configured by a user device, such as a personal computer 22, and operates to collect state information for various devices of various users, process the state information to derive location information, and provide the location information to location applications 24, automatically or in response to a request. Each location application 24 is associated with a user device (not shown), and provides location information when requested or provides alerts to the associated user based on location information associated with other users and derived from the location system 20. Preferably, the location application 24 subscribes to the location system 20 and identifies the users whose location information is desired. The location system 20 will accept these subscriptions as well as register participating users and their associated devices. The location system 20 may also implement various location delivery rules to allow users to control the dissemination of their location information to other users. Notably, various profiles may be established to allow select groups of users to obtain more location information than other groups. Accordingly, each registered user may implement filters or rules to control dissemination of their information to other users. In the converse, users subscribing to receive location information of others may also establish profiles identifying the users whose location information is desired and the types of location information they wish to receive. A registrar 26 may be provided on the packet-switched network 12 to maintain a relationship between the logical and the physical addresses of devices that directly or indirectly communicate with the location system 20. Such registration is typically required only when there is a change between the logical or user addresses and the physical addresses of a given device.

In one embodiment, the switch 14 is configured to provide state information corresponding to the status, mode, state, predicted location, or a combination thereof associated with a telephony device 16 to the location system 20. In this embodiment, it is preferable to provide a proxy server 28 to act as a liaison between the switch 14 and the location system 20. As such, the switch 14 will provide state information to the proxy server 28, which will represent the switch 14 to the location system 20 in traditional proxy fashion. Those skilled in the art will recognize that the proxy server 28 is optional and may prove beneficial with certain communication protocols.

The location information provided to the location system 20 from the switch 14 will depend on the application and the type of communication environment. For example, the traditional landline telephone 16A will not change location, and will typically provide location information only as a part of registration, and dynamically provide a mechanism to determine state information relating to its operation. For example, the switch 14 that serves telephone 16A can determine whether the telephone is on-hook or off-hook, and thus determine whether the user is engaged in a telephone call. More sophisticated systems may be able to determine whether the party is on a conference call, on hold, and whether any settings on the phone indicate that the user is in or out of the office. Accordingly, the state information gathered by the switch 14 in association with the operation of telephone 16A is used to create location information to send to the location system 20 via the proxy server 28.

For mobile terminals, such as the mobile telephone 16B, the servicing mobility switching center (SMSC), which is represented by the switch 14, may gather all of the state information described above, as well as provide dynamic location information derived directly from the mobile terminal 16B or from the circuit-switched network 10. Accordingly, the state information for mobile devices may include dynamic location information, which provides the location system 20 the opportunity to distribute location information to the various location applications 24 based on dynamic location, if so desired. The location information may be provided by the mobile terminal 16B, if equipped with location detection technology, such as that provided by the Global Positioning System (GPS), wherein the mobile terminal 16B receives the GPS coordinates and may provide either the coordinates to the switch 14, which will determine the mobile terminal's location, or may process the GPS information to determine a location, which is then sent to the switch 14. Alternatively, triangulation techniques may be used to determine the mobile terminal's location, which may be stored in a location database 30 or like device. The location database 30 may be accessed via the switch 14 to obtain location information, or the location database 30 may be configured such that the location system 20 or an associated device may directly access it via the packet-switched network 12. In other embodiments, the servicing base station or access point is associated with a general location. Further, wireless local area network hot spot technology may be used, wherein the location of the serving access point is used to determine the location of the mobile terminal 16.

Packet-based telephony devices, such as the packet telephone system 32, essentially emulate the operation of circuit-switched telephony devices 16 over the packet-switched network 12. Thus, a fixed or mobile packet telephone system 32 may be configured to automatically provide state information bearing on a user's location to the location system 20, directly or indirectly via a proxy server 28. The packet telephone system 32 will include a user interface 34 and a control system 36. As those skilled in the art will recognize, the packet telephone system 32 may be integrated into a single device, or may be implemented in multiple devices in a client-server configuration. For the latter case, the proxy server 28 may be further configured to support various operational features of the packet telephone system 32.

The user interface 34 may include a microphone and speaker to facilitate voice communications, as well as various keypads and displays to allow user interaction in traditional fashion. The control system 36 will operate to support the user interface 34 and provide the requisite functionality to enable the packet telephone system 32 to facilitate communications with other devices on the packet-switched network 12 directly or indirectly via the proxy server 28. For the purposes of description, assume that the control system 36 is capable of gathering and providing state information for the packet telephone system 32. In wireless environments, a wireless packet-switched network (not shown) is necessary to facilitate communications with the packet-switched network 12.

In addition to the telephony-based updates, an unlimited number of devices or systems with which users directly or indirectly interact may be modified to provide state information. The devices and systems may include cable or satellite television systems 38, internet appliances 40, wireless telemetry devices 42, PCs 44, biometric devices 46, physical presence detections systems 48, entertainment systems 50, and the like. For example, set-top boxes or receivers of cable or satellite systems may be configured to provide state updates to a central location, which forwards the updates to the location system 20 in association with the user. These devices are normally on disparate networks and configured to communicate various types of information, such as billing information, to a central location. Preferably, a server at the central location will facilitate delivery of state information to the location system 20. The server may be configured to monitor the respective devices to determine state changes, or may simply receive state changes generated by the devices. With the proliferation of broadband Internet connectivity, particularly in cable networks, devices of this type could also be directly attached to the packet switched network 12 and provide state updates directly to the location system 20. Similarly, internet appliances 40, such as refrigerators, dishwashers, alarm systems and the like, can readily be configured to send state information relating to user interaction directly or indirectly to the location system 20.

Wireless telemetry devices 42 may monitor a user's interaction or location associated with a person or vehicle and provide state information to the location system 20. Similarly, biometric devices 46, which monitor or check biometric data of the user, and physical presence detection systems 48, which monitor physical presence, may provide state information to the location system 20. Entertainment systems 50, such as home theater systems, gaming consoles, televisions, and the like can sense user activity and provide state updates to the location system 20. Any of these devices and systems may be connected directly or indirectly, via a gateway or the like, to the Internet.

Figure 2:
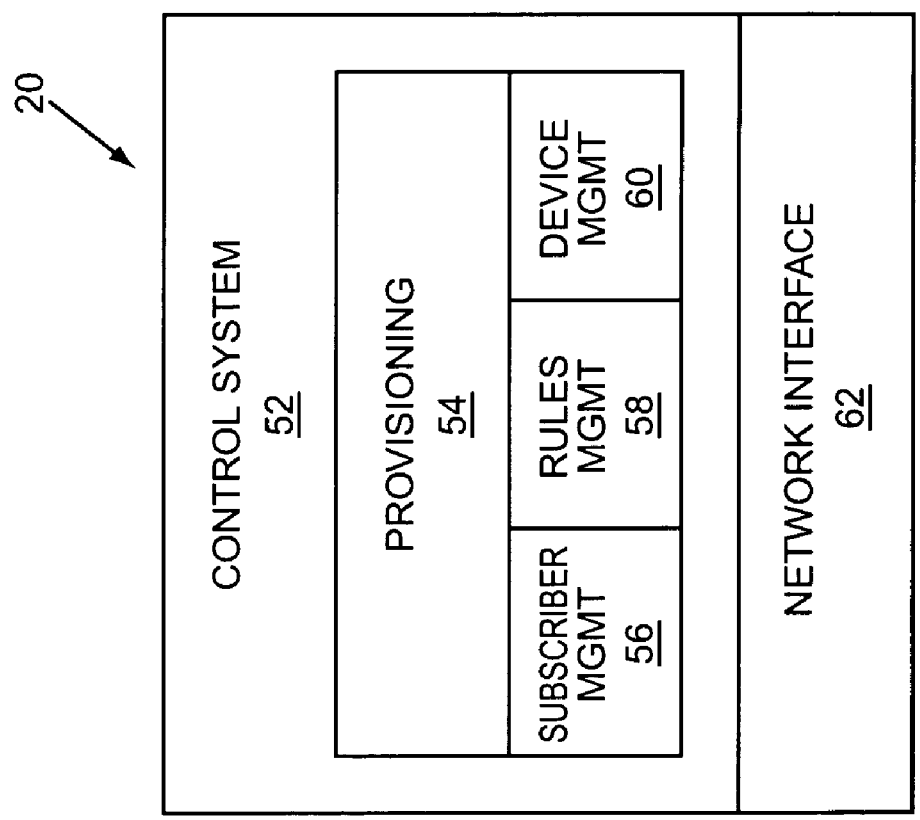
FIG. 2 is a logical representation of a location system according to one embodiment of the present invention.

The location system 20 may be implemented in one or more systems. With reference to FIG. 2, a logical breakdown of one embodiment of the location system 20 is illustrated. The location system 20 includes a control system 52 adapted to implement provisioning logic 54, subscriber management logic 56, rules management logic 58, and device management logic 60. The device management logic 60 facilitates and controls interaction with the various devices, which are configured to provide state information to the location service 20 based on user interaction. The subscriber management logic 56 facilitates and controls interaction with the location applications 24 associated with subscribers.

Accordingly, the location applications 24 will subscribe to the location system 20 to receive status updates for one or more users via the subscriber management logic 56. Based on the subscription, the location system 20 will receive state information from the various devices, evaluate the state information to generate location information using rules in the rules management logic 58, and deliver the location information to the subscribing location application 24. The device management logic 60 will control interaction with the various devices providing state information. Such control may include configuring the device to provide the state information in a specified manner and format. The provisioning logic 54 facilitates provisioning of the subscriber management logic 56, rules management logic 58, and device management logic 60. Provisioning may include establishing a profile for the user providing location information. The profile will typically identify devices and their respective states to monitor, provide rules for evaluating the state information to generate the location information, and identify individuals, systems, or applications authorized to receive the information. The control system 52 is also associated with a network interface 62 for facilitating communications over the packet-switched network 12.

An exemplary process for initializing the location system 20 to disseminate location information is outlined in FIG. 3. Initially, the user must establish an identification (ID) for the location system 20 (step 100). The location system 20 will then receive a profile for the user (step 102). Based on the profile, the location system 20 is provisioned to receive state information from the devices (sources) (step 104). Preferably, the device management logic 60 is configured to receive the state information from the provisioned devices. To configure the devices, users may have to interact directly with the devices themselves, or some server or switch that they are attached to, in order to configure the devices to start sending status information to a certain entity associated with the location system 20 or directly to the location system 20. An exemplary model may be for the devices to subscribe to supply information on behalf of a user, who will essentially authorize the devices to provide the state information. Next, the rules for evaluating the state information are established based on the profile (step 106). At this point, the rules management logic 58 and device management logic 60 are configured for a given user. The rules typically define how to evaluate the state information, how to deliver the resultant location information, and to whom the location information should be delivered.

Those skilled in the art will recognize limitless variations in profile and rule constructions for evaluating state information and generating location information to send to subscribing location applications. Further, any combination of current and past device state information may be used to determine the location information. Preferably, the location information is automatically updated, if necessary, when state changes are detected. Depending on the location rules, a state change from a given device may or may not impact the location information. If the location information does not change, then there may not be a need to update the subscribing location applications 24.

Depending on the user's profile, the location information may be disseminated to different people or different groups of people in different ways. Further, different location information may be provided to these different groups in different formats, or different location information may be provided even though state information remains unchanged. For example, certain entities may always be able to access the location information. These entities may be friends or family members, and in particular, emergency services agencies. Whether or not location information is provided or how the location information is provided may be based on whether the subscriber is in a particular list, or not in a particular list. The location information may be based on the location of the subscriber as well as the location of the individual providing the location information. In addition, certain entities, individuals, or groups may receive fake or preset location information, as desired by the user. The providing of location information may also be based on time and date. The rules dictating what location information is provided, and to whom the information is provided, is based on the rules in the established profile. For example, the user may only want to provide location information to select retailers, when they are within a certain proximity of that retailer. The user may not want other retailers, even in that same vicinity, to receive the location information. Those skilled in the art will recognize numerous ways to establish the profile and control the dissemination of the location information in light of the teachings of the present invention.

FIG. 4 provides an exemplary process for subscribing to location updates for a user through the location system 20. Initially, a subscriber, via their location application 24, will send a request to subscribe to the location system 20. The subscription management logic 56 of the location system 20 will receive the request for location information from the location application 24 (step 200). The location service 20 will authorize the request (step 202), and, if authorized, provide initial location information to the subscribing location application 24 (step 204). The initial location information may be default location information or that based on current states of the devices as evaluated by the rules. Once subscribed, the location system 20 will provide location information to the location application 24 as state information from the devices changes in a manner warranting a location update (step 206).

FIG. 5 illustrates an exemplary process for evaluating state information from the provisioned devices. The process continuously receives state information from all provisioned devices (step 300) and applies the rules for the user based on the user profile (step 302). Notably, the location application 24 or subscriber associated therewith can also provide a profile to configure or otherwise filter the types of location information requested. Finally, the rules management logic 58 will evaluate the state changes and create location information, if necessary, to send to the subscribing location application 24 (step 304).

Accordingly, the present invention automatically receives state information from human interactions with devices and evaluates the state information using a rules-based location system that takes into account relatively static preferences supplied directly by the user wishing to project an indication of location along with optional positional data associated with the devices. Those skilled in the art will recognize that manually provided state information may be used by the rules logic management 58 in combination with those initiated from naturally occurring interactions.

Although many communication protocols may be used to facilitate communications, including delivery of state and location information between the various devices, the Session Initiation Protocol (SIP) or the SIP for Instant Messaging and Location Leveraging Extensions (SIMPLE) protocol is implemented in one embodiment of the present invention. The specification for SIP is provided in the Internet Engineering Task Force's RFC 2543: Session Initiation Protocol Internet Draft, which is incorporated herein by reference in its entirety.

In general, a SIP proxy, such as may be provided by the proxy server 28, may facilitate media sessions between any number of endpoints, which represent the devices communicating with each other. These endpoints may support any one or combination of data, audio, and voice or other media sessions, depending on the configuration of the respective endpoints. In addition to traditional SIP endpoints, endpoints for the present invention may take the form of the switch 14, the registrar 26, the location system 20, the device running the location application 24, and the like.

A SIP endpoint is generally capable of running an application, which is referred to as a user agent (UA), and is capable of facilitating media sessions using SIP. User agents register their ability to establish sessions with a SIP proxy, such as the proxy server 28, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages. When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

The following example illustrates detailed message flows related to telephony devices, which are in one particular class of devices that can provide state information. Other classes of devices, including but not limited to those previously discussed, may have their own unique message flows to achieve similar results. Those skilled in the art will recognize there are many implementation methods possible for associating devices with the location system 20. This SIP-based example provides a relatively simple explanation of relevant message flows.

Figure 6:
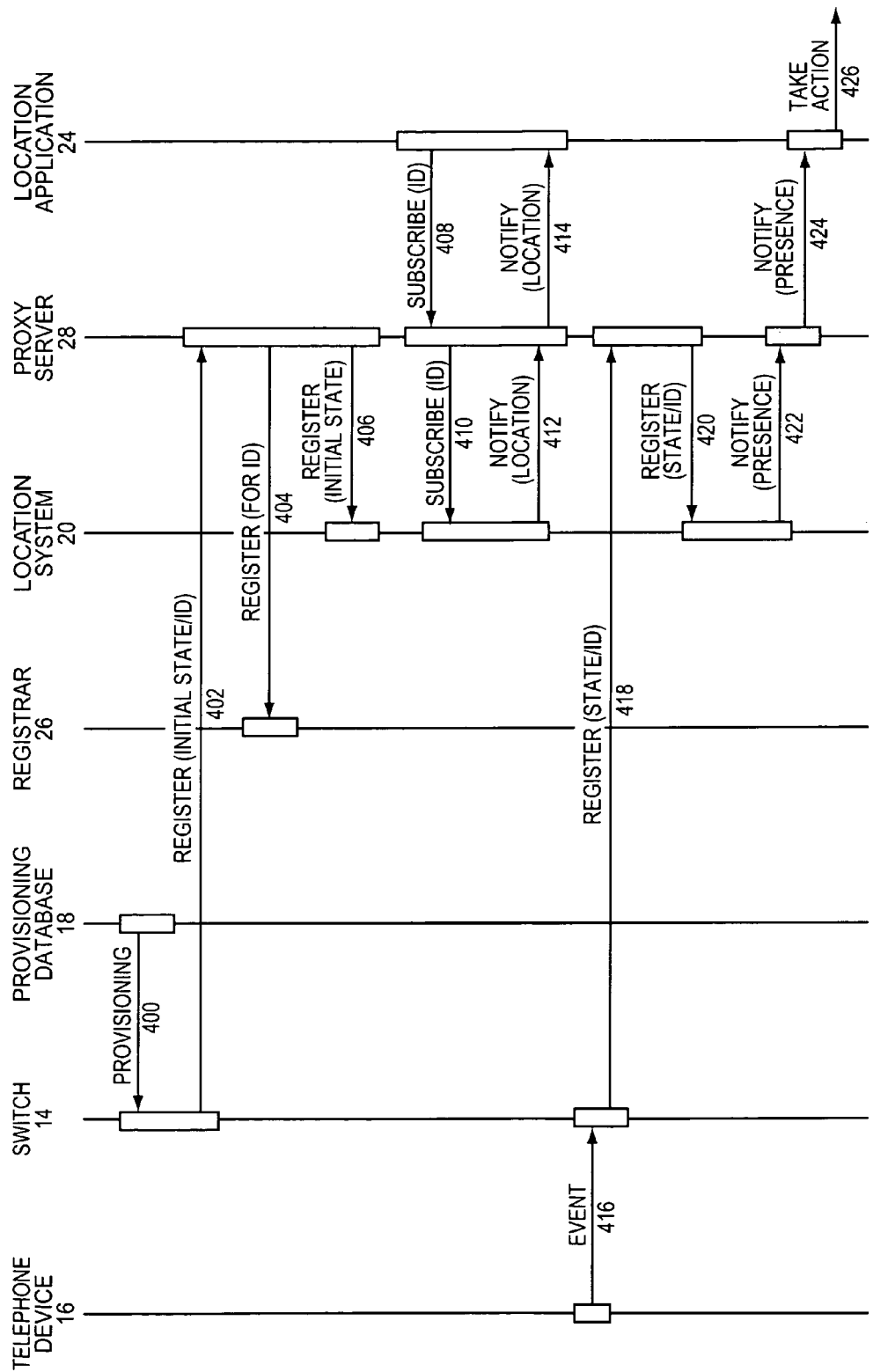
FIG. 6 is a communication flow outlining an exemplary process for automatically providing state information from a telephony system.

An exemplary message flow for providing state information relating to a telephony device 16 on the circuit-switched network 10 is illustrated in FIG. 6. Although the SIP protocol is used for illustration, those skilled in the art will recognize the general functionality of the described messages and the applicability of other protocols. Further, the switch 14 is preferably configured to monitor states resulting from naturally occurring user interactions and provide corresponding state information to the location system 20. For example, the natural interaction could be the user selecting a mode of operation, such as ring, meeting (off or vibrate), or actually participating in a call.

The flow begins when a user initially requests activation of the telephony device 16 through a local exchange carrier or like entity, which controls access and communications for the telephony device 16. Typically, the telephony device 16 is provisioned when provisioning information is sent from the provisioning database 18 to the switch 14 (step 400). The traditional provisioning information is supplemented with information indicating whether the user of telephony device 16 wishes to subscribe to the location service provided by the location system 20. Accordingly, the switch 14 will receive the provisioning information from the provisioning database 18 and provision the telephony device 16, as well as store information that correlates the relationship between the telephony device 16 and a location ID, which is used by the location system 20 for determining the state of the telephony device 16. The telephony device 16 is typically identified on the circuit-switched network 10 using a directory number, caller identification, or similar designation. A user may be able to dynamically provision a device from the device, without requiring the network operator to take action.

Once the provisioning of telephony device 16 is complete, the switch 14 will send a REGISTER message to the proxy server 28 (step 402). Preferably, the switch 14 registers as a user agent, and the proxy server 28 acts as a SIP proxy server. The REGISTER message effectively registers the ability of the switch 14 to provide location information with the SIP proxy 28. In particular, the REGISTER message informs the proxy server 28 of the SIP URL that identifies the user agent of the switch 14 to the (SIP) packet-switched network 12. The REGISTER message may also contain information about how to reach the user agent over the packet-switched network 12, typically by providing the Internet Protocol (IP) address and port that the user agent will use for SIP sessions. Preferably, the REGISTER message will also include an initial state of the telephony device 16 and identification indicia for the telephony device 16. The identification indicia in a SIP environment is preferably a SIP ID, which is the logical address associated with the telephony device 16 as represented on the packet-switched network 12.

In response to this initial REGISTER message, the proxy server 28 will send a like REGISTER message to the registrar 26 to register the telephony device 16 with the registrar 26 (step 404). Further, the proxy server 28 may also forward the REGISTER message to the location system 20 (step 406). At this point, the location system 20 has registered the telephony device 16 and has associated an initial state for the telephony device 16. All other devices used to determine location information of the user will register in the same or similar fashion.

The location system 20 consolidates and/or transforms device data into the state associated with a logical or user identification and provides relevant state information to the location application 24. Subsequently, the location application 24 will subscribe to the location service provided by the location system 20 to receive location information based on state changes associated the various devices of the user. Accordingly, the location application 24 will send a SUB-SCRIBE message, which includes identification information (SIP ID) of the user or telephony device 16, to the proxy server 28 (step 408), which will forward the SUBSCRIBE message to the location system 20 (step 410). In response, the location system 20 will use the SIP ID provided in the SUB-SCRIBE message to identify the user or devices for which location information is requested. Once the location system 20 has evaluated the state of the telephony device 16, a NOTIFY message, including location information for the user of the telephony device 16, is sent to the proxy server 28 (step 412), which forwards the NOTIFY message to the location application 24 (step 414). At this point, the location application 24 has subscribed to the location service 20 for the user and has received the initial location information for the user, and perhaps the state of the telephony device 16 and other devices, if so provisioned. Thus, the location application 24 may react as necessary in response to receiving the location information for the user.

Assume that the telephony device 16 changes state, such as being placed on-hook, going off-hook, initiating a hold function, going out of service, initiating a service activation, changing modes, or the like. In essence, any change of state caused by a naturally occurring transition will trigger an event, which is sent to the switch 14 in traditional fashion (step 416). In addition to normal processing of the event, the switch 14 will recognize that the telephony device 16 has been provisioned to alert the location system 20 of state changes, and will send a REGISTER message identifying the telephony device 16 (preferably using the SIP ID) and including the current state to the proxy server 28 (step 418), which represents the location system 20 to the switch 14. The proxy server 28 will then send a REGISTER message to register the new state in association with the identified telephony device 16 with the location system 20 (step 420). The location system 20 will then process the state information to create the location information for the user and send a NOTIFY message, if necessary, to the proxy server 28 to provide the updated location information (step 422). The proxy server 28 will forward the NOTIFY message, which includes the location information, to the location application 24 (step 424), which can then take appropriate action based on the location information (step 426). As noted above, the state information may be associated with location information in an appropriately configured wireless communication system.

Those skilled in the art will recognize that the use of REGISTER messages is only one implementation. In general, the switch 14 or some other device that provides autonomous state change information can use a REGISTER message or some other undefined message to notify the location system 20. If the location system 20 subscribes to the information on the switch 14, which changes the role of the switch 14 to that of a location user agent, it would allow the use of NOTIFY messages to communicate the state information to the location system 20.

The switch 14 may be configured to provide a table, which correlates the identification of the telephony device 16 on the circuit-switched network 10 with a location identity, which is preferably a SIP address or URL. Using this table, the switch 14 can identify state changes for the telephony device 16, process the changes based on the rules management logic 58, and send updated state information indirectly or directly to the location system 20. For example, assume that a user has subscribed to an automatic location service from a cellular communication operator. Part of the service subscription process will provision a location address and correlate it with a registered mobile telephone 16B, based either upon the mobile identification number, a SIM card identification, the telephone number, or like designation.

Whenever the user's mobile telephone 16B is on and in reach of the mobile network, a home location register (HLR) is made aware of this fact as part of the normal course of cellular telephone operation. The HLR can register on-line status on behalf of the user's location identification based on this information. As noted, the state information may include location identification in addition to traditional state information. Those skilled in the art will recognize the application of the present invention to both traditional time division multiplexing (TDM) switching systems and more recent innovations, such as IP public branch exchanges, or telephony clients, such as SIP user agents, H.323 endpoints, Microsoft NetMeeting, or real-time communication clients. Network resources, such as SIP proxies or H.323 gatekeepers, may also apply this technology if they retain call status information on the endpoints or user agents they manage.

Figure 7:
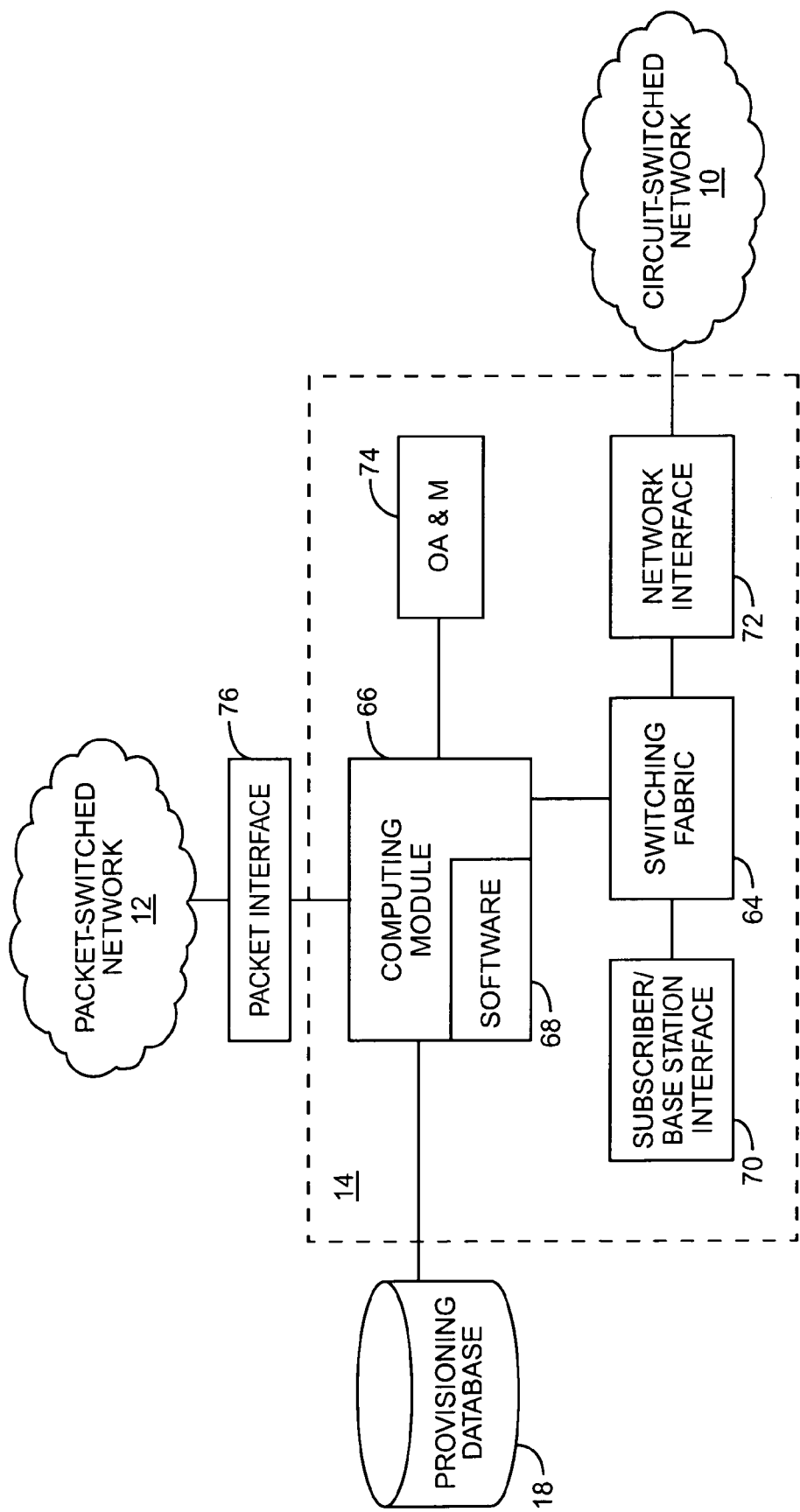
FIG. 7 is a block representation of a telephony switch constructed according to one embodiment of the present invention.

Turning now to FIG. 7, a block representation of a switch 14 is illustrated. The switch 14 is represented generically and is intended to cover the logical functionality of land-based and mobile switching systems, which include all control for call server-based functions. These switches 14 may be implemented in a variety of ways using different equipment types, such as Nortel Networks Limited's DMS-100 local switching system. The switch 14 typically includes a switching fabric module 64, a computing module 66 including storage software 68, a subscriber/base station interface 70, a network interface 72, an operations/administration and maintenance (OA & M) module 74 and a packet interface 76. The switching fabric 64 may comprise logical and physical switches for interconnecting the subscriber/base station interface 70 with the remainder of the circuit-switched network 10 through the network interface 72. Depending on a land-based or wireless embodiment, the subscriber/base station interface 70 will either directly support subscribers through subscriber lines or will support base stations, which facilitate wireless communications with mobile devices. As illustrated, the computing module 66 controls circuit-switched communications via the switching fabric 64 and is capable of providing traditional intelligent network monitoring and functions. Further, the computing module 66 may cooperate with the provisioning database 18 as described above. As noted above, the functionality of the switch 14 may be provided in various levels of integration.

In operation, the software 68 of the computing module 66 is modified to recognize state changes associated with supported telephony devices 16 and to provide the state information via the packet interface 76 either directly or indirectly to the location system 20 on the packet-switched network 12. As noted, the messages sent to the location system 20 will include identification of the associated telephony device 16, relative state information, and perhaps location information derived from a mobile telephone 16B or from elsewhere in the system. Preferably, the computing module 66 will cooperate with the provisioning database 18 to store information indicating that the particular telephony device 16 is subscribing to the location service and providing an address for sending state change messages directly or indirectly to the location system 20. The other devices providing state information are similarly configured to trigger delivery of state information upon recognizing the occurrence of an event caused by the natural interaction with the device.

Those skilled in the art will recognize improvements and modifications to the preferred embodiments of the present invention. All such improvements and modifications are considered within the scope of the concepts disclosed herein and the claims that follow.

What is claimed is:

1. A method for providing location information comprising:
   a) receiving state information from disparate multiple devices at a same location where the multiple devices have different functions and provide different types of information based on the different functions and are located on disparate networks, the state information stemming from a user's interactions with each of the multiple devices at the location, wherein the interactions are of a different type according to the different functions;
   b) evaluating the state information received from the multiple devices with location rules to create location information of the user where the location information is based on the location of the user; and
   c) sending the location information to location applications associated with a plurality of subscribers based on a profile established by the user, the profile defining levels of access to the location information for each subscriber of the plurality of subscribers, where a first subscriber of the plurality of subscribers has access to more location information than a second subscriber of the plurality of subscribers based on the profile.

2. The method of claim 1 wherein the profile defines the location applications or subscribers to which the location information is sent.

3. The method of claim 1 wherein the profile defines location applications or subscribers to which the location information should not be sent.

4. The method of claim 1 wherein different groups of subscribers have different profiles controlling the sending of the location information to the location applications.

5. The method of claim 1 wherein the profile defines when the location information is sent to the plurality of subscribers.

6. The method of claim 1 wherein the profile defines a location of the user where the location information is sent to the plurality of subscribers when the user is in the defined location.

7. The method of claim 1 wherein the profile defines a location of the user where the location information is not sent to the plurality of subscribers when the user is in the defined location.

8. The method of claim 1 wherein the profile defines dates or times controlling whether the location information is sent to the plurality of subscribers.

9. The method of claim 1 wherein the profile defines at least one of the plurality of subscribers to which preset location information is sent.

10. The method of claim 1 wherein the profile defines at least one of the plurality of subscribers to which the location information is always sent.

11. The method of claim 10 wherein the at least one of the plurality of subscribers is an emergency services group.

12. The method of claim 1 further comprising sending updated location information when the location information changes based on a change in the state information.

13. The method of claim 1 further comprising:
   generating the location rules based on the profile, wherein the location rules define how to evaluate the state information to create the location information.

14. The method of claim 1 further comprising:
   a) receiving a request from the location application to receive the location information for the user; and
   b) authorizing delivery of the location information to the location application.

15. The method of claim 14 wherein the location information sent to the location application is based at least in part on the request.

16. The method of claim 1 further comprising:
   a) determining initial location information based on initial state information for the multiple devices; and
   b) delivering the initial location information for the user to the location application upon authorizing delivery of the location information.

17. The method of claim 1 further comprising registering the multiple devices to facilitate reception of the state information.

18. The method of claim 1 wherein the state information includes the location.

19. The method of claim 1 wherein one device of the multiple devices is a telephone switch and the state information bears on a state of a telephone associated with the telephone switch.

20. The method of claim 19 wherein a first of the multiple devices is a mobile telephone switch and corresponding state information bears on the state of a mobile telephone associated with the mobile telephone switch, and a second of the multiple devices is a landline telephone switch and corresponding state information bears on the state of a landline telephone associated with the landline telephone switch.

21. The method of claim 1 wherein one device of the multiple devices is associated with a cable or satellite television system and the state information bears on a state of the one device associated with the cable or satellite television system.

22. The method of claim 1 wherein one device of the multiple devices is an internet appliance and the state information bears on a state of the internet appliance.

23. The method of claim 1 wherein one device of the multiple devices is associated with a wireless telemetry system and the state information bears on a state of the one device associated with the wireless telemetry system.

24. The method of claim 1 wherein one device of the multiple devices is an entertainment device and the state information bears on a state of the entertainment device.

25. The method of claim 1 wherein one device of the multiple devices is a physical location system and the state information bears on a physical location of the user as provided by the physical location system.

26. The method of claim 1 wherein one device of the multiple devices is an access point.

27. A system for providing location information comprising:
  a) a communication interface; and
  b) a control system operatively associated with the communication interface and adapted to:
    i) receive state information from disparate multiple devices at a location where the multiple devices have different functions and provide different types of information based on the different functions and are located on disparate networks, the state information stemming from a user's interactions with each of the multiple devices at the location, wherein the interactions are of a different type according to the different functions;
    ii) evaluate the state information received from the multiple devices with location rules to create location information of the user where the location information is based on the location of the user; and
    iii) send the location information to location applications associated with a plurality of subscribers based on a profile established by the user, the profile defining levels of access to the location information for each subscriber of the plurality of subscribers, where a first subscriber of the plurality of subscribers has access to more location information than a second subscriber of the plurality of subscribers based on the profile.

28. The system of claim 27 wherein the profile defines the location applications or subscribers to which the location information is sent.

29. The system of claim 27 wherein the profile defines location applications or subscribers to which the location information should not be sent.

30. The system of claim 27 wherein different groups of subscribers have different profiles controlling the sending of the location information to the location applications.

31. The system of claim 27 wherein the profile defines when the location information is sent to the plurality of subscribers.

32. The system of claim 27 wherein the profile defines a location of the user where the location information is sent to the plurality of subscribers when the user is in the defined location.

33. The system of claim 27 wherein the profile defines a location of the user, where the location information is not sent to the plurality of subscribers when the user is in the defined location.

34. The system of claim 27 wherein the profile defines dates or times controlling whether the location information is sent to the plurality of subscribers.

35. The system of claim 27 wherein the profile defines at least one of the plurality of subscribers to which preset location information is sent.

36. The system of claim 27 wherein the profile defines at least one of the plurality of subscribers to which the location information is always sent.

37. The system of claim 36 wherein the at least one of the plurality of subscribers is an emergency services group.

38. The system of claim 27 further comprising sending updated location information when the location information changes based on a change in the state information.

39. The system of claim 27 wherein the control system is further adapted to:
  generate the location rules based on the profile, wherein the location rules define how to evaluate the state information to create the location information.

40. The system of claim 27 wherein the control system is further adapted to:
  a) receive a request from the location application to receive the location information for the user; and
  b) authorize delivery of the location information to the location application.

41. The system of claim 40 wherein the location information sent to the location application is based at least in part on the request.

42. The system of claim 40 wherein the control system is further adapted to:
  a) determine initial location information based on initial state information for the multiple devices; and
  b) deliver the initial location information for the user to the location application upon authorizing delivery of the location information.

43. The system of claim 27 wherein the control system is further adapted to register the multiple devices to facilitate reception of the state information.

44. The system of claim 27 wherein the state information includes the location.

45. The system of claim 27 wherein one device of the multiple devices is a telephone switch and the state information bears on a state of a telephone associated with the telephone switch.

46. The system of claim 45 wherein a first of the multiple devices is a mobile telephone switch and corresponding state information bears on the state of a mobile telephone associated with the mobile telephone switch, and a second of the multiple devices is a landline telephone switch and corresponding state information bears on the state of a landline telephone associated with the landline telephone switch.

47. The system of claim 27 wherein one device of the multiple devices is associated with a cable or satellite television system and the state information bears on a state of the one device associated with the cable or satellite television system.

48. The system of claim 27 wherein one device of the multiple devices is an internet appliance and the state information bears on a state of the internet appliance.

49. The system of claim 27 wherein one device of the multiple devices is associated with a wireless telemetry system and the state information bears on a state of the device associated with the wireless telemetry system.

50. The system of claim 27 wherein one device of the multiple devices is an entertainment device and the state information bears on a state of the entertainment device.

51. The system of claim 27 wherein one device of the multiple devices is a physical location system and the state information bears on a physical location of the user as determined by the physical location system.

52. The system of claim 27 wherein one device of the multiple devices is an access point.

\* \* \* \* \*